United States Patent Office 3,690,845
Patented Sept. 12, 1972

3,690,845
CRYSTALLIZATION OF A METAL CHLORATE FROM A CHLORATE-CHLORIDE CONTAINING SOLUTION
Morris P. Grotheer, Lewiston, N.Y., assignor to Hooker Chemical Corporation, Niagara Falls, N.Y.
Filed Dec. 22, 1969, Ser. No. 887,216
Int. Cl. C01b *11/14*
U.S. Cl. 23—300                                    5 Claims

ABSTRACT OF THE DISCLOSURE

A process is provided for crystallizing an alkali metal chlorate from an aqueous solution containing an alkali metal chlorate and the same alkali metal chloride mixture, which comprises introducing the same alkali metal hydroxide into said solution in an amount sufficient to depress the solubility of said alkali metal chlorate and cooling the solution from an initial temperature of from 80–100° C. to an ultimate temperature of from 25 to 40° C. It has been found that in the presence of a common metal hydroxide, the solubility of an alkali metal chlorate is greatly reduced whereas the solubility of a common metal chloride is not greatly affected.

BACKGROUND OF THE INVENTION

This invention relates to the crystallization of an alkali metal chlorate from a solution containing a mixture of chlorate and chloride ions. More particularly, this invention relates to a method for crystallization of sodium chlorate from an aqueous solution containing sodium chlorate and sodium chloride in a manner particularly suitable for use with continuous sodium chlorate production methods.

Sodium chlorate is commonly produced by the electrolysis of an aqueous solution of sodium chloride under conditions which produce a cell effluent containing both sodium chloride and sodium chlorate. Several electrolytic and combination electrolytic and chemical methods are known for producing sodium chlorate. Independent of the particular method utilized, sodium chlorate is most commonly produced in admixture with residual amounts of sodium chloride. The methods for separating sodium chlorate from the residual amounts to sodium chloride have generally been multi-step evaporating and concentrating procedures followed by cooling to a temperature substantially below the temperature of the originally produced sodium chloride-sodium chlorate solution. In the evaporating and concentrating steps of these processes, the solubility of the sodium chloride is exceeded and the solid salt is removed by filtration. This salt is then redissolved and returned to the electrolytic process.

Conventionally, an amount of hypochlorite is present in the sodium chlorate-sodium chloride containing solution to render the solution extremely corrosive toward processing equipment. This high concentration of hypochlorite requires the use of a retention tank or some equivalent treatment for removal of hypochlorite prior to passage of the chlorate-chloride containing solution to the crystatllizing equipment. A high hypochlorite content is a characteristic of the use of a reactor in which the chlorine and caustic emanating from a diaphragm type electrolytic cell are reacted to produce an alkali metal chlorate. Likewise a relatively high hypochlorite containing effluent emanates from a conventional diaphragmless electrolytic cell operation.

It has recently been discovered that an alkali metal chlorate containing solution emanating from a reactor may be returned to a diaphragm type electrolytic cell after acidification of the solution to afford an anolyte feed having a pH of about 1 to 5. An example of the operation of a diaphragm type chlorate electrolytic cell is presented in U.S. 3,464,901. In the process disclosed in that patent, the feed to the chlorate crystallizer came from the retention tank in which the hypochlorite content of the solution emanating from the chlorine-caustic reactor was removed.

SUMMARY OF THE INVENTION

In accordance with the instant invention, there is provided a process for the selective crystallization of an alkali metal chlorate from an aqueous solution containing an alkali metal chlorate and the same alkali metal chloride which comprises introducing the same alkali metal hydroxide into said solution in an amount sufficient to depress the solubility of said alkali metal chlorate and cooling said solution from an initial temperature of from about 80–100° C. to a final temperature of from about 25–40° C.

The addition of alkali metal hydroxide to a chlorate-chloride containing aqueous solution may be performed manually by the direct addition of solid caustic, thereby avoiding the introduction of additional water to the processing system, or electrochemically, as in the case of electrolytic decomposition of alkali metal chloride to produce alkali metal hydroxide in the cathode compartment of a diaphragm chlorate cell. However the manual addition of an aqueous solution of alkali metal hydroxide is also within the purview of this invention. Preferably for manual addition, aqueous caustic is employed as a 10–73, and more preferably a 50–73 percent solution of alkali metal hydroxide, on a weight basis.

It is to be understood, that throughout this specification, by reference to a chlorate. chloride, hydroxide or hypochlorite it is intended to encompass an alkali metal salt of the stated anion. The alkali metal cation of each anion is the same alkali metal cation, to avoid any consideration of metathesis.

The present invention is particularly useful for producing crystalline sodium chlorate in a continuous process involving the electrolysis of an aqueous solution of sodium chloride in a diaphragm type chlor-alkali cell with subsequent reaction of the chlorine and metal hydroxide generated to produce a metal hypochlorite and a metal chlorate, wherein at least a portion of the metal chlorate containing solution is recycled to the anode compartment of the electrolytic cell. It has been found that in lieu of crystallization of the metal chlorate from the effluent solution of the chlorine-metal hydroxide reactor, that the chlorate containing cell liquor emanating directly from the cathode compartment of the diaphragm type chlorate cell may be employed, without treatment to remove hypochlorite, as the solution from which the metal chlorate is crystallized. The advantages attending crystallization of a metal chlorate directly from the cell liquor emanating from the cathode compartment of a diaphragm type chlorate cell include the advantages attending the use of simpler construction materials such as mild steel as opposed to the rather exotic materials of construction (glass, glass-lined steel, titanium) necessary for the apparatus used in the crystallization of chlorate from a hypochlorite containing solution. Likewise, it has been found that the metal hydroxide content of the cell liquor emanating from the cathode compartment of a diaphragm type chlorate cell actually depresses the solubility of the metal chlorate. Thus, the removal of metal chlorate from the cell liquor of a diaphragm type chlorate cell, requires a lesser degree of cooling than does a chlorate containing solution in the absence of a metal hydroxide, to obtain the same weight percent of solid metal chlorate crystals. The cooling of the cell liquor may be effected in any conventional manner, however, it is especially desirable, in conformity with the preferred aspect of the instant invention, to evaporately cool the cell liquor.

Even in the presence of hypochlorite found in the chlorate liquor from a conventional chlorate cell or in the effluent from a chemical chlorate reactor in which excess chlorine is reacted with an alkali metal hydroxide, the addition of an alkali metal hydroxide to the chlorate-chloride-hypochlorite containing solution depresses the chlorate solubility and at the same time retards the corrosive action of the hypochlorite to the point that conventional crystallization equipment may be used without the use of a retention tank to decompose hypochlorite, or with a much shorter retention period when very high hypochlorite concentrations are encountered. In any event, the conventional retention tank may be completely omitted from processing equipment because the period of time taken for purification of the chlorate containing solution prior to passage to the crystallizer may be such that any excessive amount of hypochlorite is reduced to acceptable levels in the alkaline solution.

The technique of this invention is also especially suitable for recovering chlorates from the chlorate liquor of a conventional chlorate electrolytic cell employing dimensionally stable electrodes. Dimensionally stable electrodes are those electrodes which expose active electrode sites to the electrolyte from a relatively non-active metal base. For example, a noble metal oxide coating on a titanium or tantalum substrate affords a dimensionally stable electrode. Conventional chlorate cells equipped with dimensionally stable electrodes may be operated at temperatures up to and exceeding 80° C. The concentration of chlorate in the chlorate liquor is considerably above that of chlorate liquor from a conventional chlorate cell operating at a temperature from about 40–45° C. with graphite, lead oxide and steel electrodes. Thus, the addition of hydroxide to the chlorate liquor from an electrolytic cell equipped with dimensionally stable anodes depresses the solubility of the chlorate and retards the corrosive action of hypochloride while having little noticeable effect on the solubility of the chloride ion. The chlorate crystal crop from such concentrated chlorate liquors is very large with a relatively small addition of hydroxide. However, the amount of alkali metal hydroxide added to the chlorate containing solution may vary from 10 grams per liter of water, or preferably from 30 grams per liter of water up to and including the super-saturated state of the alkali metal chlorate.

The corrosive tendency of hypochlorite in chlorate solutions from chemical reactors or diaphragmless chlorate cells is retarded by the addition of alkali metal hydroxide, permitting the use of conventional materials in the crystallizer. The use of an aqueous caustic solution as the crystallizing medium for alkali metal chlorates is also advantageous from the standpoint that the mother liquor from the crystallizer may be neutralized with HCl to produce alkali metal chloride for subsequent electrolysis, thereby consuming by-product HCl.

The present process can be operated over a wide range of temperatures to thereby correspond and complement operating temperatures for the sodium chlorate electrolytic and/or chemical method for producing chlorates. Diaphragm type chlorate electrolytic cells may be operated so that the cell liquor leaving the electrolytic process has a temperature up to about 100° C. Likewise, conventional chlorate cells equipped with dimensionally stable anodes may be operated at temperatures up to and exceeding 80° C.

The invention will be further described with a reference to the drawings in which.

The process of the present invention is suitable for the crystallization of alkali metal chlorates, such as sodium chlorate, potassium chlorate, lithium chlorate, rubidium chlorate, cesium chlorate, and the like, from solutions containing their respective chlorides. However, because of the ready availability and the favorable solubilities, sodium chlorate is the normally produced chlorate from which other chlorates are formed. Since sodium chlorate is the most commonly produced chlorate, the invention will be further described with particular reference to sodium chlorate. However, in describing sodium chlorate it is to be understood that other alkali metal chlorates may be crystallized from their respective solutions with chlorides in a manner similar to that described for sodium chlorate.

Figure 1:
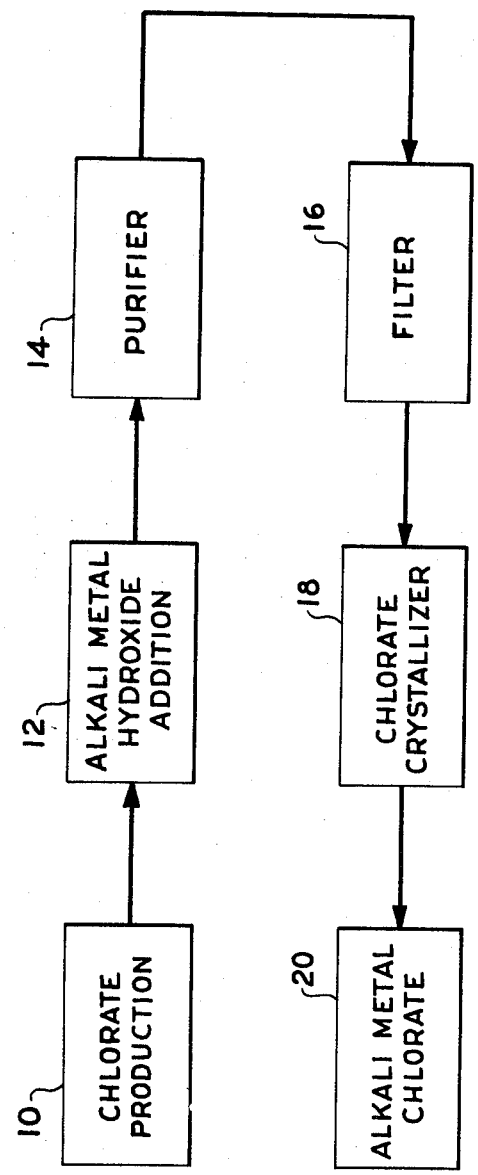
FIG. 1 is a flow sheet illustrating the process of the present invention.

In referring to the flow sheet of FIG. 1, chlorates are produced in reactor 10 either chemically by the reaction of chlorine with an alkali metal hydroxide or by the electrolysis of an aqueous solution of alkali metal chloride. The product from reactor 10 is passed to zone 12 for addition of alkali metal hydroxide. Where a diaphragm type chlorate cell is employed, zone 12 represents the electrolytic cell.

The chlorate containing solution is then optionally passed to a purification zone 14. Any necessary steps for treating the chlorate containing solution are performed in zone 14. For instance, when sodium dichromate is employed as a depolarizer in the electrolytic production of alkali metal chlorates, the dichromate may be removed in zone 14 by the addition of a reagent such as a soluble barium salt ($BaCl_2$) followed by the addition of an alkali metal carbonate ($Na_2CO_3$) to precipitate any excess barium. It is not essential that dichromate ions be removed from the chlorate containing solution. An alkali metal chlorate may be crystallized from a dichromate containing solution and the filtrate containing the dichromate ion may be returned to the electrolytic cell for further use. The solution is then passed through filter 16 to remove solid impurities and the filtrate is introduced into crystallizer 18.

The preferred method for selectively recovering an alkali metal chlorate from solution is by evaporative cooling. The precipitated or crystallized sodium chlorate is then removed (20) by any conventional technique. The mother liquor from the chlorate crystallizer is returned to the electrolytic cell if that is the method employed for producing chlorate with or without adjustment of sodium chloride content, water content, pH or temperature. The electrolytic cell may operate in a temperature range of about 40° C. up to as high as about 100° C. However, it is preferred to provide a cell liquor emanating from the electrolytic cell which has a temperature beween 80–100° C., to maximize the amount of sodium chlorate contained in the solution as well as the amount crystallized upon cooling in crystallizer 18.

Crystallizer 18 can be any conventional crystallizer, including evaporatively cooled crystallizers. If an evaporatively cooled crystallizer is used, a greater proportion of sodium chlorate can be removed with the same temperature drop due to the removal of water. In most instances, the crystallization is readily effected in the crystallizer which is cooled merely by cooling fluids such as water on a heat exchanger principle. Thus, cooling coils or other heat exchanger devices are positioned in the crystallizer or more preferably, a stream of liquor is withdrawn from the crystallizer, pased through the heat exchanger to remove heat and subsequently returned to the crystallizer as cooled liquor. Independent of the particular cooling method employed, the liquor in the crystallizer becomes super-saturated with respect to sodium chlorate because of reducing the temperature thereof. Therefore, depending on the cooling effected, a crop of chlorate crystals is precipitated from the chlorate-chloride-hydroxide solution.

At high levels of super-saturation, the crystallization of sodium chlorate is spontaneous. Under continuous operating conditions, chlorate particles present in the crystallizer act as a seeding material.

The amount of cooling effected in the crystallizer determines the amount of crystals removed from the crystallizer liquor. The amount of chlorate removed for any given concentration of chlorate and chloride can be determined with reference to FIG. 2. In continuous crystallization processes, particularly when the mother liquor is returned to an electrolytic cell for further reaction, the temperature change used to effect the crystallization is from about 10 to 60° C. and more preferably about 20 to 40° C., thus, the crystallizer operates in a temperature range of about 20 to 40° C. on a chlorate-chloride-hydroxide containing cell liquor fed to the crystallizer at a temperature from about 80–100° C.

Crystallized sodium chlorate is removed from crystallizer 18 by withdrawing a stream of liquor from a settling zone in the crystallizer and treating it by any conventional technique for removal of solid material, such as filtration, centrifugation, etc.

Under continuous crystallizing conditions, clear mother liquor is withdrawn from a quiet zone in crystallizer 18 for recycle to a chlorate production cell. The mother liquor can be fed to an electrolytic cell after being adjusted with make-up brine, and optionally adjustment of the pH, temperature and/or water content.

Figure 2:
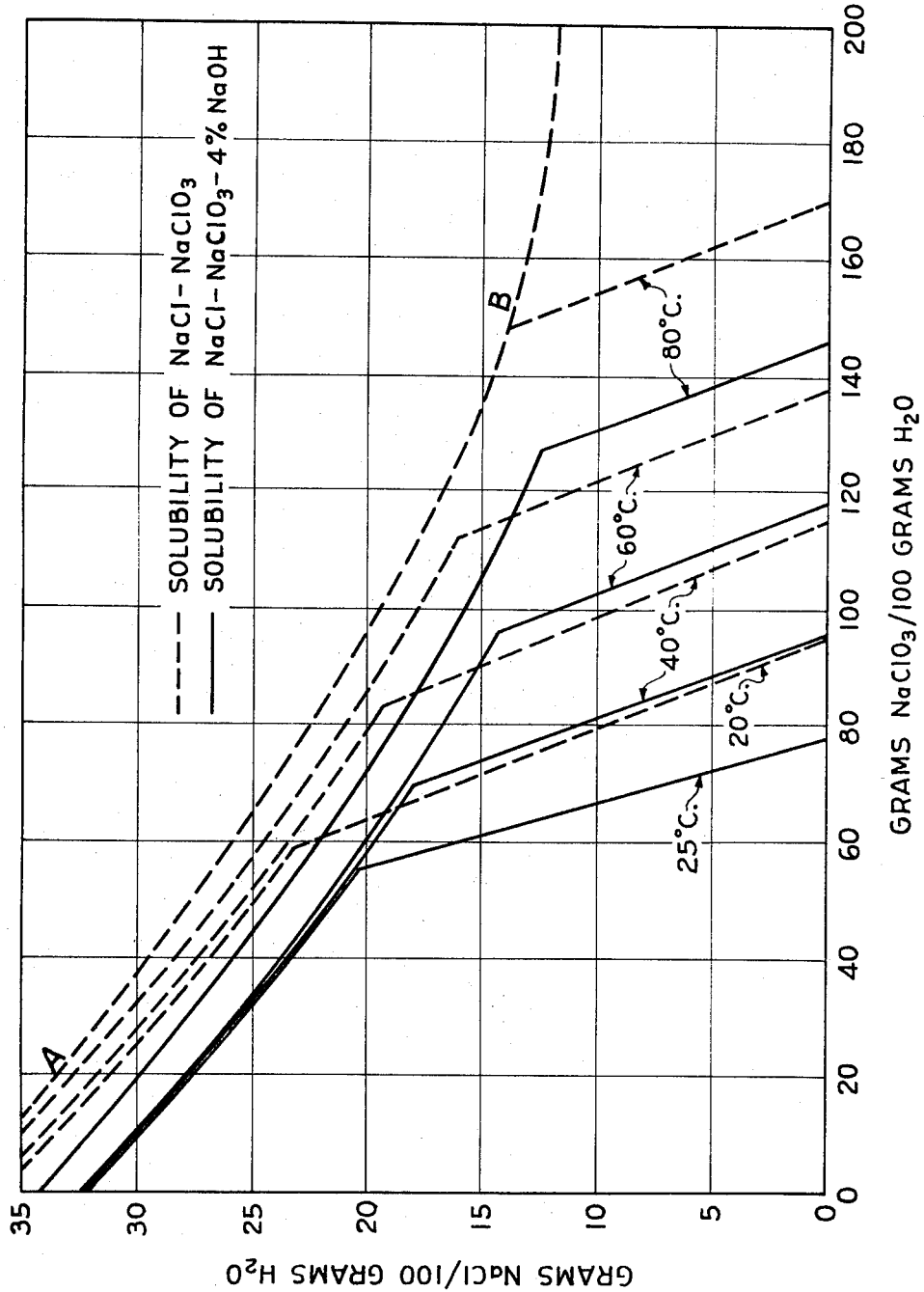
FIG. 2 is a graph illustrating the solubility relationship between sodium chloride and sodium chlorate in a temperature range of from 0 to 80° C., and a comparative graph demonstrating the solubility of sodium chlorate in a sodium chloride-sodium chlorate-sodium hydroxide system.

As may be readily seen from FIG. 2, the presence of sodium hydroxide in a sodium chlorate-sodium chloride solution depresses the solubility of sodium chlorate dramatically. At any given concentration of sodium chlorate and sodium chloride, by cooling the solution to the next lower isotherm, the amount of sodium chlorate precipitated may be obtained by reference to the horizontal axis of the graph presented in FIG. 2. The line A–B of FIG. 2 represents the normal solubility curve for a sodium chlorate-sodium chloride mixture. The line A–B on the graph divides the solubilities in a manner such that below line A–B the solid phase is sodium chlorate and above line A–B the solid phase is sodium chloride. A cell liquor effluent from a diaphragm type chlorate cell normally contains from 350 to 800 grams sodium chlorate, 80 to 200 grams sodium chloride, 30 to 150 grams sodium hydroxide per liter of water. By evaporative cooling, the concentration of the solution increases linearly.

The invention will be further described by the following examples. Unless otherwise indicated, all temperatures are in ° C. and all parts are by weight.

EXAMPLE I

A diaphragm type chlorate electrolytic cell operating in accordance with the description presented in U.S. 3,464,901 can produce solutions containing up to approximately 600 grams per liter of sodium chlorate without loss in current efficiency. This example presents a tabulation of operating cell data to demonstrate typical concentrations of sodium chloride, sodium chlorate, sodium hypochlorite and sodium hydroxide compositions in both the anolyte and catholyte compartments of a chlorate diaphragm cell. The anode current efficiency were determined by gas analysis.

TABLE I

| Anolyte | | | | Catholyte | | | | |
|---|---|---|---|---|---|---|---|---|
| NaCl, g.p.l. | NaClO₃, g.p.l. | NaClO, g.p.l. | pH | NaCl, g.p.l. | NaClO₃, g.p.l. | NaClO, g.p.l. | NaOH, g.p.l. | Percent C.E. |
| 120 | 578 | 0.19 | 2.6 | 107 | 538 | Nil | 60.0 | 98.3 |
| 130 | 606 | 0.19 | 2.0 | 99 | 558 | Nil | 84.0 | 99.0 |
| 128 | 590 | 0.18 | 2.5 | 123 | 580 | Nil | 36.4 | |
| 128 | 574 | 0.20 | 2.5 | 120 | 526 | Nil | 68.0 | 98.0 |

The above data illustrates the absence of hypochlorite in cell liquor. By correlation of the tabulated data with FIG. 2, it may be seen that the presence of 4 weight percent sodium hydroxide increases the crystal point of a chloride-chlorate solution 15 to 20° C. Higher concentrations of sodium hydroxide decrease the solubility of chlorate further. Solutions containing about 500 to 600 grams per liter sodium chlorate, 100 to 150 grams per liter sodium chloride, 60 grams per liter sodium hydroxide and 2 grams per liter sodium dichromate yield a good crop of sodium chlorate crystals when cooled by vacuum evaporation from the range of 80 to 95° C. down to 30 to 40° C.

EXAMPLE II

A sample of cell liquor from a diaphragm chlorate cell containing 534 grams per liter sodium chlorate, 114 grams per liter sodium chloride and 56 grams per liter sodium hydroxide was cooled by vacuum evaporation from 80° C. to 30° C. and in a separate run from 95° C. to 35° C. to crystallize sodium chlorate. The conditions of both runs are set forth in the following tabulation of data. The mother liquor composition remaining after removal of the sodium chlorate crystals as well as the composition of the solid crystalline material recovered demonstrates the applicability of the instant invention.

TABLE II

| Initial composition | | | | |
|---|---|---|---|---|
| | G.p.l. | G./100 g. H₂O | Crystallization | Mother liquor composition |
| NaClO₃ | 534 | 74.55 | Cooled by vac. evap. | 442 g.p.l. 57.7 g./ 100 g. H₂O |
| NaCl | 114 | 15.93 | From 80° C. to 30° C. | 125 g.p.l. 17.3 g./ 100 g. H₂O |
| NaOH | 56 | 7.82 | Final v.p.=20 mm | 63 g.p.l. 8.25 g./ 100 g. H₂O |

Crystals were 99.7% NaClO₃, 0.25% NaCl, 0.038% NaOH: crystals were 25% of the total initial solids and washed sparingly.

| NaClO₃ | 534 | 74.55 | Cooled by vac. evap. | 460 g.p.l. 61.2 g./ 100 g. H₂O |
| NaCl | 114 | 15.93 | From 95° C. to 35° C. | 126.7 g.p.l. 16.82 g./ 100 g. H₂O |
| NaOH | 56 | 7.82 | Final v.p.=28.5 mm | 66.2 g.p.l. 8.94 g./ 100 g. H₂O |

Crystals were more than 20% of total initial solids and contained 99.8% NaClO₃. They were washed adequately.

What is claimed is:

1. A process for crystallizing sodium chlorate from an aqueous solution of sodium chlorate and sodium chloride which comprises forming a solution containing 450 to 800 grams per liter sodium chlorate and 80 to 200 grams per liter sodium chloride, which solution is at a temperature of 80 to 100 degrees C., adding sodium hydroxide to said solution in an amount sufficient to provide from 30 to 150 grams per liter sodium hydroxide in the solution and, thereafter, cooling the said solution having said portions of sodium chlorate, sodium chloride and sodium hydroxide, respectively, from the initial 80 to 100 degrees C. temperature to a final temperature of 25 to 40 degrees C., thereby enhancing crystallization and separation sodium chlorate from sodium chloride in said solution in the presence of sodium hydroxide.

2. The process of claim 1 in which said cooling is evaporative cooling.

3. The process as claimed in claim 1 wherein the aqueous solution treated also contains hypochlorite ions.

4. The process of claim 3 in which solid sodium hydroxide is added to said chlorate containing solution.

5. The process of claim 3 in which an aqueous solution containing from about 10 to 73 percent sodium hydroxide is added to said chlorate containing solution.

References Cited
UNITED STATES PATENTS

| | | | |
|---|---|---|---|
| 2,884,309 | 3/1959 | Carlson | 23—85 |
| 3,094,380 | 6/1963 | Bruce | 23—300 |
| 3,464,901 | 9/1969 | Grotheer | 204—95 |

NORMAN YUDKOFF, Primary Examiner

S. SILVERBERG, Assistant Examiner

U.S. Cl. X.R.

23—302, 85